(12) United States Patent
Thiel

(10) Patent No.: US 7,947,373 B2
(45) Date of Patent: May 24, 2011

(54) HIGH LUMINANCE COATED GLASS

(75) Inventor: James P. Thiel, Pittsburgh, PA (US)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 0 days.

(21) Appl. No.: 10/965,390

(22) Filed: Oct. 14, 2004

(65) Prior Publication Data

US 2006/0081993 A1    Apr. 20, 2006

(51) Int. Cl.
*B32B 17/06*    (2006.01)
(52) U.S. Cl. ........................................ 428/432; 428/434
(58) Field of Classification Search .................. 428/432, 428/434
See application file for complete search history.

(56) References Cited

U.S. PATENT DOCUMENTS

| | | | |
|---|---|---|---|
| 3,660,061 A | 5/1972 | Donley et al. .................... 65/32.4 |
| 4,111,150 A | 9/1978 | Donley et al. .................. 118/704 |
| 4,379,040 A | 4/1983 | Gillery ..................... 204/192.13 |
| 4,716,086 A | 12/1987 | Gillery ........................... 428/630 |
| 4,719,126 A | 1/1988 | Henery ........................... 427/165 |
| 4,719,127 A | 1/1988 | Greenberg ..................... 427/165 |
| 4,853,257 A | 8/1989 | Henery ........................... 427/166 |
| 4,861,669 A | 8/1989 | Gillery ........................... 428/434 |
| 4,900,633 A | 2/1990 | Gillery ........................... 428/432 |
| 4,971,843 A | 11/1990 | Michelotti et al. .............. 428/34 |
| 5,464,657 A | 11/1995 | Athey et al. ................. 427/255.5 |
| 5,536,718 A | 7/1996 | Albright et al. ................ 514/220 |
| 5,599,387 A | 2/1997 | Neuman et al. ........... 106/287.14 |
| 5,834,103 A * | 11/1998 | Bond et al. ..................... 428/216 |
| 5,902,505 A * | 5/1999 | Finley ............................ 219/547 |
| 5,948,131 A | 9/1999 | Neuman ......................... 65/60.2 |
| 6,445,503 B1 * | 9/2002 | Lingle ............................ 359/585 |
| 2003/0180547 A1* | 9/2003 | Buhay et al. ................... 428/434 |
| 2003/0224181 A1* | 12/2003 | Finley et al. ................... 428/432 |

* cited by examiner

*Primary Examiner* — David Vu
*Assistant Examiner* — Earl N Taylor
(74) *Attorney, Agent, or Firm* — Cohen & Grigsby, P.C.

(57) ABSTRACT

A coating composition and related coated substrates are disclosed. The coating composition of the present invention includes a first dielectric layer having a thickness ranging from 380 Å to 430 Å; a first metal layer over the first dielectric layer having a thickness ranging from 60 Å to 130 Å; a first primer layer over the first dielectric layer having a thickness ranging from 10 Å to 30 Å; a second dielectric layer over the first primer layer having a thickness ranging from 880 Å to 1020 Å; a second metal layer over the second dielectric layer having a thickness ranging from 100 Å to 180 Å; a second primer layer over the second metal layer having a thickness ranging from 10 Å to 30 Å; and a third dielectric layer over the second primer layer having a thickness ranging from 240 Å to 520 Å.

17 Claims, 1 Drawing Sheet

HIGH LUMINANCE COATED GLASS

FIELD OF INVENTION

The present invention relates to solar management coatings and related coated substrates.

BACKGROUND OF THE INVENTION

Substrates are used in a variety of applications such as buildings, automobiles, appliances, etc. Oftentimes, substrates are coated with a functional coating(s) to exhibit the desired performance properties. Examples of functional coatings include electroconductive coatings, photocatalytic coatings, thermal management coatings, solar management coatings, hydrophilic coatings, etc.

A solar management coating is typically made up of one or more metal layers such as silver, gold, etc. sandwiched between two layers of dielectric material such as metal oxides, oxides of metal alloys, nitrides, oxynitrides, etc. Solar management coatings are often applied on glass substrates to selectively transmit and reflect various electromagnetic wavelengths. When glass substrates coated with a solar management coating are incorporated into cars and homes, they help reduce costs associated with heating and/or cooling.

One popular configuration for a solar management coating is as follows: a first dielectric layer over a substrate; a first silver layer over the first dielectric layer; a second dielectric layer over the first silver layer; a second silver layer over the second dielectric layer; and a third dielectric layer over the silver layer. The described configuration is often referred to as a double silver coating in the industry.

The present invention provides a substrate coated with a novel solar management coating. A coated substrate according to the present invention can exhibit high luminance which is desirable in certain automotive applications.

SUMMARY OF THE INVENTION

Figure 1:
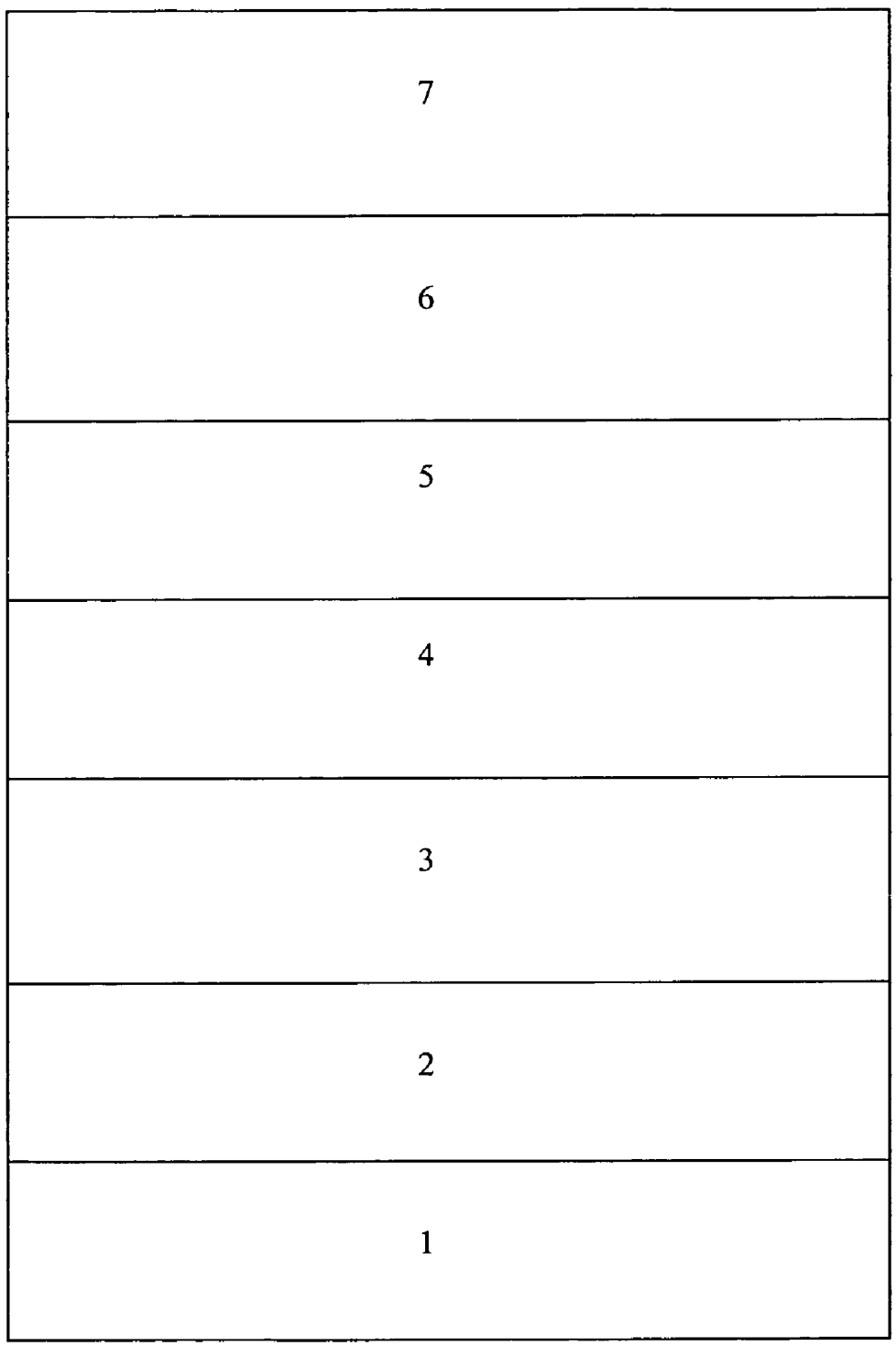
FIG. 1 is a cross-sectional view of the coating composition according to the present invention.

In a non-limiting embodiment, the present invention is a coating composition comprising: first dielectric layer having a thickness ranging from 380 Å to 430 Å; a first metal layer over the first dielectric layer having a thickness ranging from 60 Å to 130 Å; a first primer layer over the first dielectric layer having a thickness ranging from 10 Å to 30 Å; a second dielectric layer over the first primer layer having a thickness ranging from 880 Å to 1020 Å; a second metal layer over the second dielectric layer having a thickness ranging from 100 Å to 180 Å; a second primer layer over the second metal layer having a thickness ranging from 10 Å to 30 Å; and a third dielectric layer over the second primer layer having a thickness ranging from 240 Å to 520 Å.

In another embodiment, the present invention is a coated substrate comprising a substrate coated with the coating composition described above.

In yet another embodiment, the present invention is a laminated product containing a first glass ply and a second glass ply having a coating on at least one of the glass plies, wherein the coating comprises: a first dielectric layer having a thickness ranging from 380 Å to 430 Å over the glass substrate; a first metal layer having a thickness ranging from 60 Å to 130 Å over the first dielectric layer; a first primer layer having a thickness ranging from 10 Å to 30 Å over the first metal layer; a second dielectric layer having a thickness ranging from 880 Å to 1020 Å over the first primer layer; a second metal layer having a thickness ranging from 100 Å to 180 Å over the second dielectric layer; a second primer layer having a thickness ranging from 10 Å to 30 Å over the second metal layer; and a third dielectric layer having a thickness ranging from 240 Å to 520 Å over the second primer layer, wherein the laminated product exhibits an L* of equal to or greater than 48.

DESCRIPTION OF THE INVENTION

As used herein, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.7, 5.5 to 10, or 6.5 to 9.5, just to name a few.

As used herein, the terms "deposited over", "applied over", or "formed over" mean deposited, applied, or formed on but not necessarily in contact with the surface. For example, a material "deposited over" a substrate does not preclude the presence of one or more other materials of the same or different composition located between the deposited material and the substrate.

As used herein, a "coating composition", "coating" or "coating stack" can be comprised of one or more "layers". A "layer" can be comprised of one or more "films". The term "film" refers to a region of a coating having a desired or selected composition.

As used herein, the term "luminance" refers to the amount of visible light that comes to a person's eye from a surface. The light leaving the surface can be due to reflection, transmission, and/or emission. Brightness is the perceptual correlate of luminance. Luminance is not the same as "reflectance" which refers to the proportion of light that is reflected from a surface.

In a non-limiting embodiment, the present invention is a coating composition comprising a first dielectric layer 1; a first metal layer 2 over the first dielectric layer 1; a first primer layer 3 over the first metal layer 2; a second dielectric layer 4 over the first primer layer 3; a second metal layer 5 over the second dielectric layer 4; a second primer layer 6 over the second metal layer 5; and a third dielectric layer 7 over the second primer layer 6.

The first, second and third dielectric layers 1, 4 and 7 can be made up of a single film or a plurality of films. Each of the dielectric layers in the coating can have the same composition or a different composition. Suitable materials for the dielectric layers include, but are not limited to, metal oxides, oxides of metal alloys, nitrides, oxynitrides, or mixtures thereof. Examples of suitable metal oxides include, but are not limited to, oxides of titanium, hafnium, zirconium, niobium, zinc, bismuth, lead, indium, tin, and mixtures thereof. Additionally, oxides of metal alloys or metal mixtures can be used, such as oxides containing zinc and tin, oxides of zinc-tin alloys, oxides of indium-tin alloys, silicon nitrides, silicon aluminum nitrides, oxynitrides, or aluminum nitrides.

In a non-limiting embodiment of the invention, one or more of the dielectric layers can comprise a metal alloy oxide film comprising a zinc/tin alloy oxide. The zinc/tin alloy can comprise zinc and tin in proportions of 10 wt. % to 90 wt. % zinc and 90 wt. % to 10 wt. % tin.

In a non-limiting embodiment of the invention, one or more of the dielectric layers can comprise zinc stannate. The term "zinc stannate" refers to a composition of $Zn_xSn_{1-x}O_{2-x}$ (Formula 1) where x is greater than 0 but less than 1. If $x=\frac{2}{3}$, for example, the zinc stannate formed would be represented by $Zn_{2/3}Sn_{1/3}O_{4/3}$ which is commonly described as "$Zn_2SnO_4$". A zinc stannate containing coating has one or more of films according to Formula 1 in a predominant amount.

In a non-limiting embodiment of the invention, one or more of the dielectric layers can be made up of a material that is doped with, for example, antimony, nickel, boron, manganese, indium, etc. For example, the dielectric layer(s) can comprise tin oxide doped with antimony or indium, silicon oxide doped with nickel or boron, zinc oxide doped with tin, etc.

According to the present invention, the metal layers 2 and 5 can be made of materials such as, but not limited to, gold, copper, or silver as well as mixtures and alloys thereof.

According to the present invention, the primer layers 3 and 6 can be made of materials which are oxygen-capturing materials, such as, but not limited to, titanium. An oxygen-capturing material has an affinity for oxygen that is greater than the affinity for oxygen of the metal layer it overlies. This enables the primer layer to serve as a sacrificial layer during the deposition process and prevent degradation or oxidation of the metal layer during processing.

Optionally, the coating of the present invention can include an outermost protective coating as is well known in the art to provide mechanical and chemical durability. Examples of suitable protective overcoats, include, but are not limited to, a layer of titanium oxide as disclosed in U.S. Pat. No. 4,716,086, the disclosure of which is incorporated herein by reference.

In a non-limiting embodiment of the invention, the thicknesses of the various layers of the coating are as described below. The thickness of the first dielectric layer 1 ranges from 380 Å to 430 Å, for example from 390 Å to 420 Å or from 395 Å to 418 Å. The thickness of the first metal layer 2 ranges from 60 Å to 130 Å, for example from 70 Å to 125 Å or from 80-122. The thickness of the first primer layer 3 ranges from 10 Å to 30 Å, for example from 12 Å to 28 Å or from 14 Å to 26 Å. The thickness of the second dielectric layer 4 ranges from 880 Å to 1020 Å, for example from 890 Å to 1010 Å or from 895 Å to 990 Å. The thickness of the second metal layer 5 ranges from 100 Å to 180 Å, for example from 110 Å to 170 Å or from 115 Å to 166 Å. The thickness of the second primer layer 6 ranges from 10 Å to 30 Å, for example from 12 Å to 28 Å or from 14 Å to 26 Å. The thickness of the third dielectric layer 7 ranges from 240 Å to 520 Å, for example from 245 Å to 515 Å or from 250 Å to 508 Å.

The coating composition of the present invention can be applied on various types of substrates. Suitable substrates include: plastic substrates (such as, but not limited to, acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); metal substrates (such as, but not limited to, galvanized steel, stainless steel, and aluminum); ceramic substrates; tile substrates; glass substrates; fiberglass substrates; or mixtures or combinations of any of the above.

In a non-limiting embodiment of the present invention, the substrate is glass. The glass can be of any type, such as conventional float glass or flat glass, and can be of any composition having any optical properties, e.g., any value of visible radiation transmission, ultraviolet radiation transmission, infrared radiation transmission, and/or total solar energy transmission. For example, the substrate can be conventional untinted soda-lime-silica glass, i.e., "clear glass", or can be tinted or otherwise colored glass, borosilicate glass, leaded glass, tempered, untempered, annealed, or heat-strengthened glass.

The various coating layers in the present invention can be deposited on a substrate using any of the conventional coating techniques such as chemical vapor deposition ("CVD"), spray pyrolysis, and magnetron sputtered vacuum deposition ("MSVD"), etc. as are well known in the art. The described coating techniques can be used to deposit coating films as well as coating layers.

Suitable CVD methods of deposition are described in the following references, which are hereby incorporated by reference: U.S. Pat. Nos. 4,853,257; 4,971,843; 5,536,718; 5,464,657; 5,599,387; and 5,948,131.

Suitable spray pyrolysis methods of deposition are described in the following references, which are hereby incorporated by reference: U.S. Pat. Nos. 4,719,126; 4,719,127; 4,111,150; and 3,660,061.

Suitable MSVD methods of deposition are described in the following references, which are hereby incorporated by reference: U.S. Pat. Nos. 4,379,040; 4,861,669; and 4,900,633.

In embodiments that contain at least one dielectric layer comprised of a zinc/tin alloy oxide, the zinc/tin alloy oxide can be obtained via magnetron sputter vacuum deposition ("MSVD") by sputtering a cathode comprising an alloy of zinc and tin that can comprise zinc and tin in proportions of 10 wt. % to 90 wt. % zinc and 90 wt. % to 10 wt. % tin.

In a non-limiting embodiment, the present invention is a coated glass substrate which is fabricated into a laminated product as is well known in the art. For example, the laminated product can comprise a coated glass substrate (also referred to as a "ply" herein) according to the present invention bonded to another piece of glass by an interlayer. The interlayer can be made up of a polyester film, a polyvinylpyrrolidone film, a polyvinyl butyral film, etc.

According to the present invention, the coating can be on any of the glass surfaces that make up the laminated product. Typically, the coating will be applied on a surface of a glass substrate that will not be exposed to the environment such as the inwardly facing surface of an outer glass ply. In the art, the unexposed surfaces of a laminate comprising two glass plies are referred to as the #2 and #3 surfaces, wherein the #1 surface is the surface exposed to the environment and each subsequent surface is referred to by the next highest number.

The laminated product of the present invention can be used to make any transparency in a vehicle such as an automobile, an aircraft, boats, trucks, etc. For example, the laminated product of the invention can be used to make an automobile windshield, a back or side window, a sunroof, etc. In the United States, if the laminated product is used as a windshield, it must transmit at least 70% of the incident visible light. In other words, the laminated product has a visible light transmittance ("Lta")≧70%.

In a non-limiting embodiment of the present invention, the laminated product comprises a coated glass substrate according to the present invention and exhibits a luminance (L* in the CIE color coordinate system) of equal to or greater than 48. Due to the exhibited luminance value, the laminated product appears shiny, i.e. light appears much brighter on the outside of the window, i.e. on the same side as the light source, than it does on the inside of the window, which is desirable property for certain commercial applications. When used in an automotive window, the laminated product can create an illusion of privacy for passengers in the vehicle. In a non-limiting embodiment of the laminated product of the present invention, the laminated product is used as automotive privacy glass and exhibits an Lta ranging between 20% and 35%.

As should be appreciated by one skilled in the art, in addition to the coating, the Lta of a coated glass substrate or laminate is further impacted by the type and thickness of the glass substrate(s).

The aesthetics of a coated substrate according to the present invention can be changed by manipulating the various coating layer thicknesses. In most applications, the described aesthetics of the substrate refer to the side of the substrate where the light source is, for example, the aesthetics of glass used in an automobile as viewed from the outside of the automobile. The aesthetics of the coated substrate are recited using CIE chromaticity 1976 coordinates (a*, b* and L*) for Illuminant C with a 2° Observer.

In a non-limiting embodiment of the invention, the invention is a laminated product that exhibits a* ranging from 0 to −3, b* ranging from 0 to −5 and L* equal to or greater than 48. This embodiment can be accomplished by applying the following coating on at least one of the plies used to form the laminated product: a first dielectric layer having a thickness ranging from 400 Å to 408 Å; a first metal layer over the first dielectric layer having a thickness ranging from 76 Å to 84 Å; a first primer layer over the first metal layer having a thickness ranging from 16 Å to 24 Å; a second dielectric layer over the first primer layer having a thickness ranging from 896 Å to 904 Å; a second metal layer over the second dielectric layer having a thickness ranging from 142 Å to 150 Å; a second primer layer over the second metal layer having a thickness ranging from 16 Å to 24 Å; and a third dielectric layer over the second primer layer having a thickness ranging from 254 Å to 264 Å.

In another non-limiting embodiment of the invention, the invention is a laminated product that exhibits a* ranging from 2 to −5, b* ranging from −5 to −15 and L* equal to or greater than 48. This embodiment can be accomplished by applying the following coating on at least one of the plies used to form the laminated product: a first dielectric layer 1 having a thickness ranging from 406 Å to 414 Å; a first metal layer 2 over the first dielectric layer 1 having a thickness ranging from 88 Å to 96 Å; a first primer layer 3 over the first metal layer 2 having a thickness ranging from 16 Å to 24 Å; a second dielectric layer 4 over the first primer layer 3 having a thickness ranging from 896 Å to 904 Å; a second metal layer 5 over the second dielectric layer 4 having a thickness ranging from 157 Å to 165 Å; a second primer layer 6 over the second metal layer 5 having a thickness ranging from 16 Å to 24 Å; and a third dielectric layer 7 over the second primer layer 6 having a thickness ranging from 303 Å to 311 Å.

In yet another non-limiting embodiment of the invention, the invention is a laminated product that exhibits b* less than −15, a* greater than b*/2 and L* equal to or greater than 48. This embodiment can be accomplished by applying the following coating on at least one of the plies used to form the laminated product: a first dielectric layer 1 having a thickness ranging from 392 Å to 400 Å; a first metal layer 2 over the first dielectric layer 1 having a thickness ranging from 112 Å to 121 Å; a first primer layer 3 over the first metal layer 2 having a thickness ranging from 16 Å to 24 Å; a second dielectric layer 4 over the first primer layer 3 having a thickness ranging from 976 Å to 984 Å; a second metal layer 5 over the second dielectric layer 4 having a thickness ranging from 117 Å to 125 Å; a second primer layer 6 over the second metal layer 5 having a thickness ranging from 16 Å to 24 Å; and a third dielectric layer 7 over the second primer layer 6 having a thickness ranging from 497 Å to 505 Å.

EXAMPLES

The following non-limiting examples are included to illustrate the present invention. The aesthetic properties of three laminated products were modeled using TFCalc from Software Spectra, Inc. in Portland, Oreg. The aesthetic properties model the visual perception on an observer viewing the #1 surface (the surface exposed to the exterior environment) of the glass substrate. The following information was entered into the software to complete the modeling:

4. for the type of substrate, 2 mm×2 mm clear float glass having a thickness of 3 mm was entered;
5. for the location of the coating, #2 surface was entered; and
6. for the coating composition, the following was entered: a first dielectric layer comprising $Zn_2SnO_4$ over the substrate; a first metal layer comprising silver over the first dielectric layer; a first primer layer comprising titania over the first metal layer; a second dielectric layer comprising $Zn_2SnO_4$ over the first primer layer; a second metal layer comprising silver over the second dielectric layer; a second primer layer comprising titania over the second metal layer; and a third dielectric layer comprising $Zn_2SnO_4$ over the second primer layer. The thickness of the respective layers was different for each of the modeled samples. The layer thicknesses are shown in Table 1. Table 1 also contains information related to the color of the modeled samples.

TABLE 1

Layer Thickness and Performance Data[1] for the Experimental Samples

|  | Sample 1 | Sample 2 | Sample 3 |
|---|---|---|---|
| Thickness of the First Dielectric Layer [Å] | 404 | 410 | 396 |
| Thickness of the First Silver Layer [Å] | 80 | 92 | 117 |
| Thickness of the First Primer Layer [Å] | 20 | 20 | 20 |
| Thickness of the Second Dielectric Layer [Å] | 900 | 900 | 980 |
| Thickness of the Second Silver Layer [Å] | 146 | 161 | 121 |
| Thickness of the Second Primer Layer [Å] | 20 | 20 | 20 |
| Thickness of the Third Dielectric Layer [Å] | 260 | 307 | 501 |
| a* | −1 | −2 | −5 |
| b* | −1 | −8 | −25 |
| L* | 49 | 50 | 49 |

[1]The a*, b*, L* shown in the table represent the CIE chromaticity 1976 coordinates for Illuminant C with a 2° Observer.

As illustrated in Table 1, the thicknesses of the various layers in the coating of the present invention can be manipulated to provide different aesthetic properties, namely color. Sample 1 appears to have a neutral color to the average person. Sample 2 appears to have a silvery or shiny blue color to the average person. Sample 3 appears to have a blue color to the average person.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A highly reflective coated substrate having a blue color, comprising:
   a substrate; and
   a coating formed on the substrate, the coating comprising:
   a. a first dielectric layer comprising at least one metal oxide over the substrate and having a thickness ranging from 392 Å to 400 Å;
   b. a first metal layer over the first dielectric layer and having a thickness ranging from 112 Å to 121 Å;
   c. a first primer layer over the first metal layer and having a thickness ranging from 16 Å to 24 Å;
   d. a second dielectric layer over the first primer layer and having a thickness ranging from 976 Å to 984 Å, said second dielectric layer being a single film, and comprising an alloy of an oxide of zinc and tin;
   e. a second metal layer over the second dielectric layer and having a thickness ranging from 117 Å to 125 Å;
   f. a second primer layer over the second metal layer and having a thickness ranging from 16 Å to 24 Å; and
   g. a third dielectric layer comprising at least one metal oxide over the second primer layer and having a thickness ranging from 497 Å to 505 Å,
   wherein the coating includes only two metal layers and the coating is configured to provide an $L^*$ of at least 48, an $a^*$ of greater than $b^*/2$, and a $b^*$ of less than $-15$.

2. The coated substrate according to claim 1, wherein the first and second metal layers are selected from gold, copper, silver or mixtures thereof.

3. The coated substrate according to claim 1, wherein the first and third dielectric layers comprise an oxide selected from titanium, hafnium, zirconium, niobium, zinc, bismuth, lead, indium, tin, zinc as well as alloys and mixtures thereof.

4. The coated substrate according to claim 1, wherein at least one of the first and third dielectric layers comprises an alloy of an oxide of zinc and tin.

5. The coated substrate according to claim 4, wherein the alloy of an oxide of zinc and tin is zinc stannate.

6. The coated substrate according to claim 1 wherein the substrate is glass.

7. A laminated product having a blue color, comprising:
   a first glass ply and a second glass ply, wherein at least one of the glass plies is coated with a coating comprising:
   a. a first dielectric layer comprising at least one metal oxide over the substrate and having a thickness ranging from 392 Å to 400 Å;
   b. a first metal layer over the first dielectric layer and having a thickness ranging from 112 Å to 121 Å;
   c. a first primer layer over the first metal layer and having a thickness ranging from 16 Å to 24 Å;
   d. a second dielectric layer over the first primer layer and having a thickness ranging from 976 Å to 984 Å, said second dielectric layer being a single film, and comprising an alloy of an oxide of zinc and tin;
   e. a second metal layer over the second dielectric layer and having a thickness ranging from 117 Å to 125 Å;
   f. a second primer layer over the second metal layer and having a thickness ranging from 16 Å to 24 Å; and
   g. a third dielectric layer comprising at least one metal oxide over the second primer layer and having a thickness ranging from 497 Å to 505 Å,
   wherein the coating includes only two metal layers and the coating is configured to provide an $L^*$ of at least 48, an $a^*$ of greater than $b^*/2$, and a $b^*$ of less than $-15$.

8. The laminated product according to claim 7, wherein the first and second metal layers are selected from gold, copper, silver or mixtures thereof.

9. The laminated product according to claim 7, wherein the first and third dielectric layers comprise an oxide selected from titanium, hafnium, zirconium, niobium, zinc, bismuth, lead, indium, tin, zinc as well as alloys and mixtures thereof.

10. The laminated product according to claim 7, wherein at least one of the first and third dielectric layers comprises an alloy of an oxide of zinc and tin.

11. The laminated product according to claim 10, wherein the alloy of an oxide of zinc and tin is zinc stannate.

12. The laminated product according to claim 7, wherein the first and second primer layers comprise titania.

13. The laminate according to claim 7 wherein the laminated product is a windshield.

14. The coated substrate according to claim 1, wherein the substrate is an automotive window having an Lta in the range of 20% to 35%.

15. The laminated product of claim 7, wherein the product is an automotive privacy glass having an Lta in the range of 20% to 35%.

16. The coated substrate according to claim 1, wherein the alloy of an oxide of zinc and tin, of said second dielectric layer, is zinc stannate.

17. The laminated product according to claim 7, wherein the alloy of an oxide of zinc and tin, of said second dielectric layer, is zinc stannate.

* * * * *